United States Patent [19]

Sturdy

[11] Patent Number: 4,543,932
[45] Date of Patent: Oct. 1, 1985

[54] CABLE TRANSFER DEVICE WITH LOST MOTION COUPLING FOR GOVERNORS

[75] Inventor: Harry D. Sturdy, Wilmington, N.C.

[73] Assignee: Sturdy Truck Equipment, Inc., Wilmington, N.C.

[21] Appl. No.: 649,785

[22] Filed: Sep. 12, 1984

[51] Int. Cl.$^4$ .............................................. F02D 31/00
[52] U.S. Cl. ............................. 123/342; 123/361/376
[58] Field of Search ............... 123/319, 340, 341, 342, 123/361, 376, 396, 400, 401, 403

[56] References Cited

U.S. PATENT DOCUMENTS

| | | | |
|---|---|---|---|
| 3,547,216 | 12/1970 | Marie | 123/335 |
| 3,604,404 | 9/1971 | Pitchford | 123/363 |
| 4,016,842 | 4/1977 | Kittler | 123/396 |
| 4,181,103 | 1/1980 | Sturdy | 123/342 |
| 4,335,689 | 6/1982 | Abe et al. | 123/340 |
| 4,362,138 | 12/1982 | Krueger et al. | 123/320 |
| 4,401,077 | 8/1983 | Earl | 123/376 |

FOREIGN PATENT DOCUMENTS 239244 10/1911 Fed. Rep. of Germany ...... 123/376

Primary Examiner—William A. Cuchlinski Jr.
Attorney, Agent, or Firm—Reising, Ethington, Barnard, Perry & Milton

[57] ABSTRACT

A cable transfer device is disclosed for interconnecting the accelerator and throttle for installing a governor in a vehicle originally equipped with a single cable between the accelerator and the throttle. The transfer device comprises a fixed shaft with a drive transmitting sleeve rotatably mounted on the shaft. An accelerator lever is rotatably mounted on the sleeve and an override lever is nonrotatably mounted on the sleeve. The sleeve and the accelerator lever are interconnected by a torsion spring which exerts a biasing torque and a stop is provided to limit the rotation of the levers. A first cable is connected between the accelerator and the accelerator lever and a second cable is connected between the override lever and the throttle. A third cable is connected between the overriding throttle closing member of the governor and the override lever.

3 Claims, 4 Drawing Figures

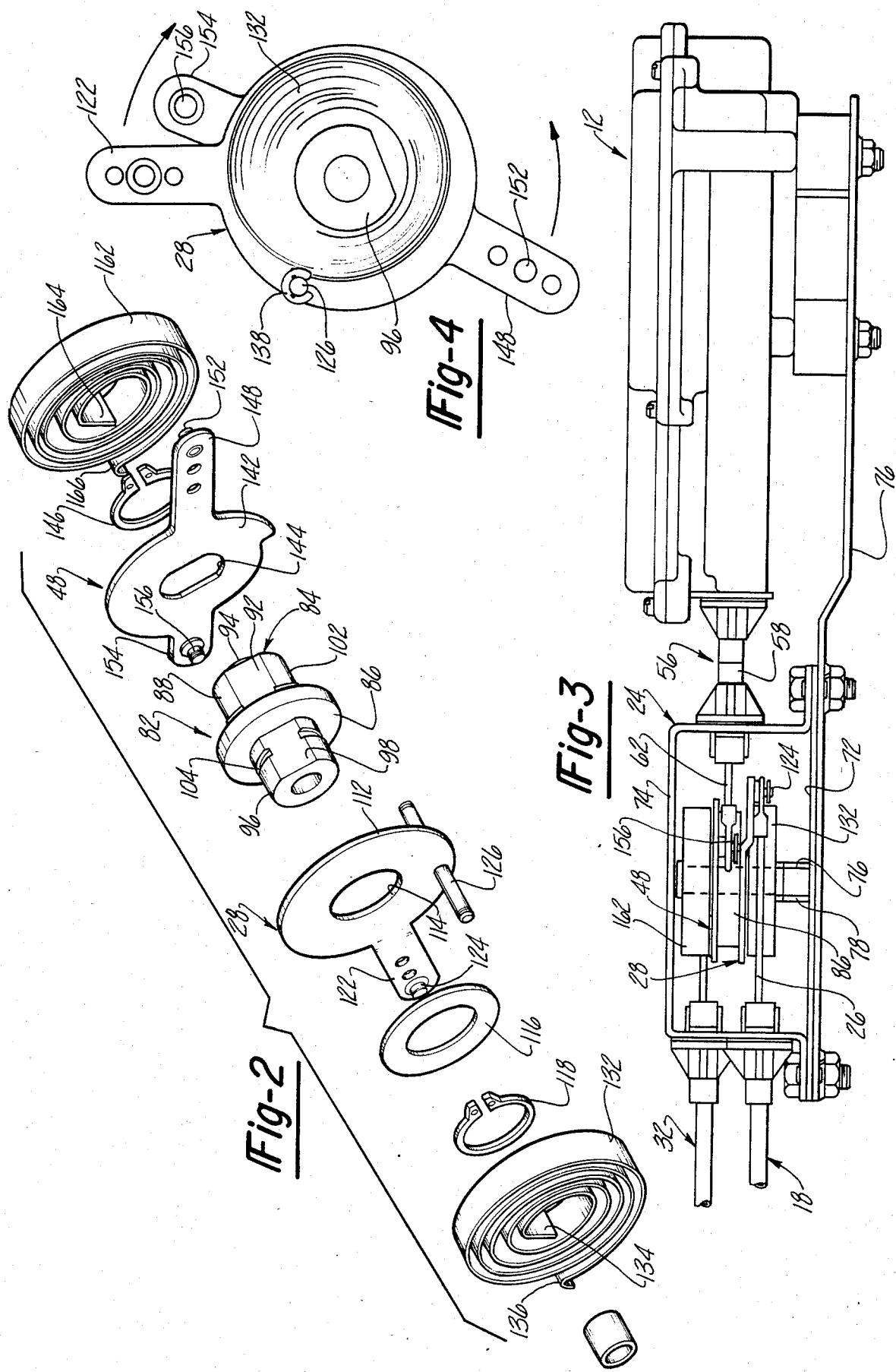

CABLE TRANSFER DEVICE WITH LOST MOTION COUPLING FOR GOVERNORS

FIELD OF THE INVENTION

This invention relates to speed governors for engines and more particularly it relates to a lost motion linkage for coupling a driver operated accelerator with a throttle control member.

BACKGROUND OF THE INVENTION

In road speed control and engine governors for vehicles, it is common practice to utilize a lost motion linkage in coupling the accelerator with the throttle control member and with an overriding throttle closing member. In general, the accelerator is coupled through a spring loaded lost motion device to the throttle control member, i.e. the throttle control arm of a carburetor or an injector control arm of a fuel injection system. The governor has an overriding throttle closing member which, when activated, is held at a throttle limiting position and is coupled to the throttle control member to prevent throttle opening beyond the limiting position. The spring loaded lost motion device is effective to couple the throttle control member with the accelerator so that it moves concurrently therewith until the throttle limiting position is reached and then further movement of the accelerator is taken up by the lost motion spring while the throttle control member is held fixed. Devices of this type are known in the prior art patents.

The Pitchford U.S. Pat. No. 3,604,404 granted Sept. 14, 1971, discloses a vehicle speed control system in which the accelerator is coupled through a throttle rod and a spring loaded lost motion device to the throttle arm of the carburetor. The lost motion device comprises a tubular housing which is connected at one end with the throttle rod. The housing contains a movable member which is connected by a ball stud with the throttle arm and which is spring biased by a compression spring in the housing. A speed control unit which is adapted to establish a throttle limiting position is coupled with the slidable member by a flexible cable, the sheath of which is attached to the other end of the housing.

The Krueger et al U.S. Pat. No. 4,362,138 granted Dec. 7, 1982, discloses a vehicle governor throttle linkage including a lost motion device. In this arrangement, the accelerator is connected through a throttle rod to one end of a tubular housing which contains a movable member coupled by a ball stud with the throttle arm of the carburetor. The movable member is spring biased by a spring which is disposed between the other end of the housing and the movable member. The governor has an overriding throttle closing member which is connected through a flexible cable to the ball stud.

The Marie U.S. Pat. No. 3,547,216 granted Dec. 15, 1970, discloses a top speed limiting device for vehicles with a lost motion device between the accelerator and the throttle arm. In this system, a fixed shaft is mounted in the housing of the governor and a connecting disk is mounted on a hub portion around the shaft. The connecting disk is connected through a link with the throttle valve of the carburetor. An accelerator actuated member having an integral hub portion is rotatably mounted on the stationary shaft outwardly of the connecting disk. A torsional spring is connected between the accelerator actuated member and a connecting disk to provide spring loaded lost motion therebetween. The hub portion of the connecting disk carries a stop tab which engages a stop limiting member movable to a throttle limiting position by the governor.

The prior art devices are not well adapted for installing a governor on an engine having, prior to governor installation, a driver operated accelerator coupled by a flexible cable to a throttle control member of the engine.

A general object of this invention is to provide a dual cable lost motion coupling for the throttle linkage of an engine governors which overcomes certain disadvantages of the prior art.

SUMMARY OF THE INVENTION

In accordance with this invention, a cable transfer device is provided for interconnecting the accelerator and throttle control member for installing a governor. It has the advantage of greatly simplifying the installation of a governor in a vehicle originally equipped with a cable connection between the accelerator and throttle control member. It is merely inserted in the cable connection and eliminates the need for modifications of the vehicle's original throttle acutation mechanism.

In accordance with this invention, a cable transfer device is provided which may be mounted adjacent the governor and connected by first and second cables with the accelerator and the throttle control member, respectively. It may be installed as part of the governor and suitably connected with the output, the overriding throttle closing member, by suitable coupling, such as a cable. The transfer device comprises a fixed shaft which carries a drive transmitting sleeve rotatably mounted thereon. An accelerator lever is rotatably mounted on the sleeve and an override lever is nonrotatably mounted on the sleeve for rotation therewith about the shaft. The sleeve and the accelerator lever are interconnected by a torsion spring means which exerts a biasing torque and stop means is provided to limit the relative rotation of the members. A first cable is connected between the accelerator and the accelerator lever and a second cable is connected between the override lever and the throttle control member. A third cable is connected between the overriding throttle closing member of the governor and the override lever. The torsion spring means is capable of transmitting sufficient torque without spring deflection so that the throttle control member moves concurrently with the accelerator until the override lever is held at a throttle limiting position by the overriding throttle closing member whereupon the spring means is deflected by further movement of the accelerator. Further, according to this invention, the drive transmitting sleeve comprises a cylindrical body having a flat surface thereon and a spacer collar between the ends. The accelerator lever is mounted by a circular opening on one side of the collar and the override lever having a noncircular opening is mounted on the other side of the collar. The stop means comprises a post on the accelerator lever and a shoulder on the override lever. The torsion spring has its outer end connected with the post and its inner end connected with the flat surface on the cylindrical body. Further, the torsion spring means comprises a pair of coil spring disposes at opposite ends of the drive transmitting sleeve.

A more complete understanding of this invention may be obtained from the detailed description that follows taken with the accompanying drawings.

DESCRIPTION OF THE DRAWINGS

FIG. 2 is an exploded view showing the parts of the cable transfer device;

FIG. 3 is an elevation view of the cable transfer device and the governor; and

FIG. 4 is a bottom plan view of the cable transfer device.

BEST MODE FOR CARRYING OUT THE INVENTION

Figure 1:
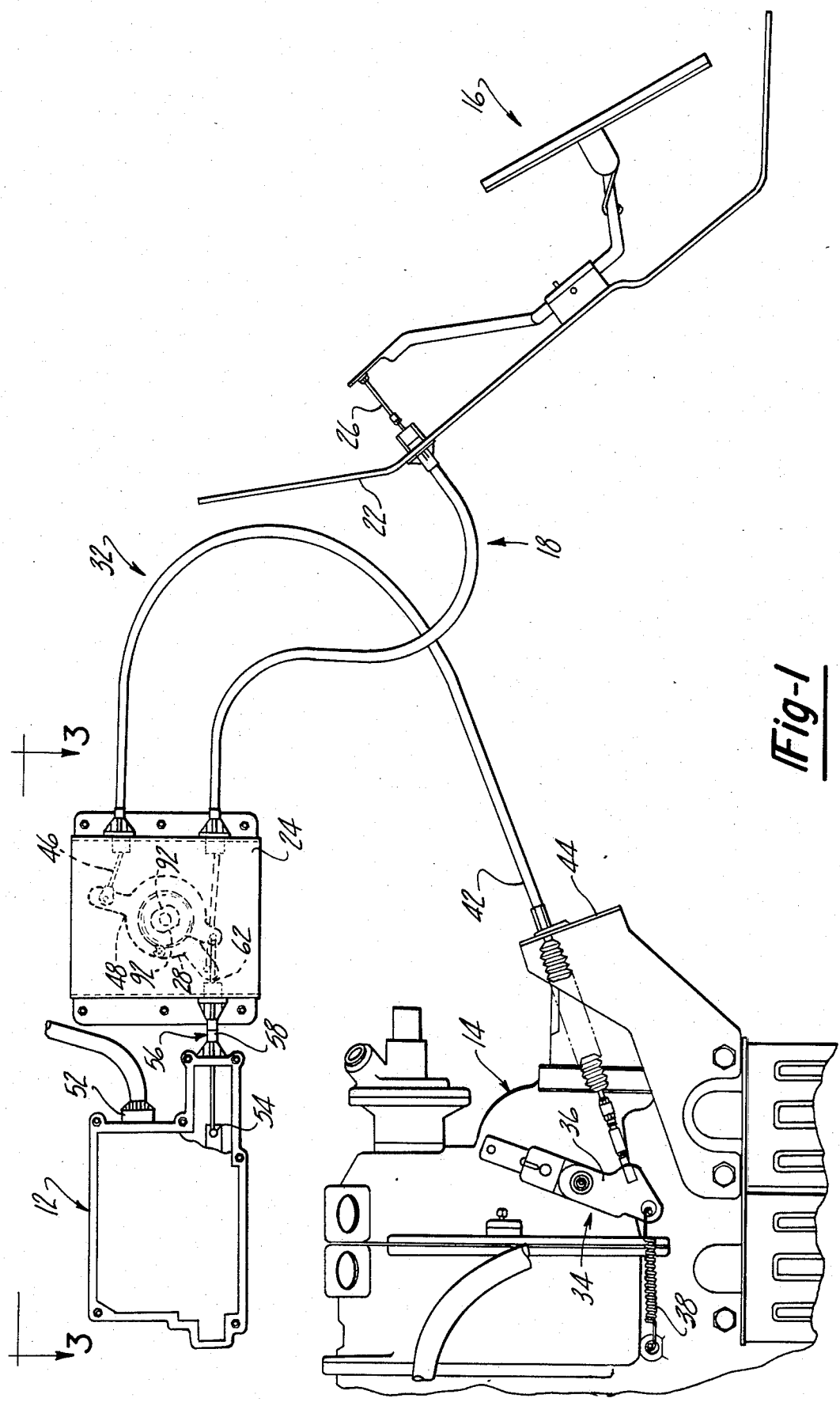
FIG. 1 shows the installation of a governor with the cable transfer device of this invention.

Referring now to the drawings, there is shown an illustrative embodiment of the invention in a cable transfer device for a governor installed in a vehicle having a fuel injected engine. It will be appreciated as the description proceeds that the invention may be embodied in different forms and utilized with carburetor engines, fuel injected engines or other fuel control systems.

FIG. 1 shows the cable transfer device 10 with a governor 12 installed in a vehicle having a fuel injected diesel engine 14 with a driver operated accelerator 16. The accelerator 16 is connected by a cable 18 with the cable transfer device 10. More particularly, the cable sheath is connected at one end with the engine firewall 22 and at the other end with the housing 24 of the transfer device 10. The cable core 26 is connected at one end to the accelerator 16 and at the other end it is connected to an accelerator lever 28. The transfer device 10 is connected by a cable 32 with the fuel or throttle control member 34 on the engine 14. The throttle control member 34 comprises a pump or injector control arm 36 provided with a return spring 38 in a conventional arrangement. The cable sheath 42 of the cable 32 is connected at one end to the housing 24 of the transfer device 10 and at the other end to the bracket 44 mounted on the engine 14. The cable core 46 is connected in the transfer device 10 to an override lever 48 and is connected at the other end to the control arm 36.

It is noted that the cable connection with the accelerator 16 and the cable connection with the engine 14 are the same as provided in the original vehicle installation. The transfer device 10 is merely inserted into the original accelerator cable, thus resulting in a dual cable connection between the accelerator and throttle arm. The governor 12 and transfer device 10 may be installed in the engine compartment in side-by-side relation as shown. The governor 12 may be of the type described in my copending application U.S. Ser. No. 459,345 filed Jan. 20, 1983 and entitled "ROAD AND ENGINE SPEED GOVERNOR". The governor 12 receives input signals including engine and vehicle speed signals through an electrical input 52. The governor 12 includes a microprocessor and control circuit which energizes a reversible motor to develop a governor output for throttle control. The governor output is an overriding throttle closing member 54 which is connected through a cable 56 with the transfer device 10. More particularly, the cable sheath 58 of cable 56 is connected at one end with the housing on the governor 12 and at the other end with the housing 24 of the device 10. The cable core 62 is connected at one end with the overriding throttle closing member 54 of the governor 12 and at the other end with the override lever 48.

The cable transfer device 10 is shown in greater detail in FIGS. 2, 3 and 4. The transfer device comprises the housing 24 which includes a base plate 72 and a cover 74. The base plate and cover are suitably bolted to a mounting panel 76 in the engine compartment; similarly, the governor 12 is mounted in an adjacent location on the panel 76. The base plate 72 supports a bearing shaft 76 which is fixedly mounted therein and extends from the base plate into an opening in the cover 74. A spacer sleeve or support bushing is fitted over the shaft 76 against the base plate 72 and a drive transmitting sleeve 82 is rotatably mounted on the shaft 76 and extends between the bushing 78 and the cover 74. The drive transmitting sleeve 82 comprises, in general, a cylindrical body 84 having a spacer collar 86 unitary therewith and disposed near the midsection thereof. The upper end 88 of the sleeve 82 is cylindrical with a pair of diametrically opposite flat surfaces 92. The upper end 88 terminates in a section 94 of reduced diameter which fits into the opening in the cover 74. The lower end 96 of the cylindrical body 84 is cylindrical with a single flat surface 98. The upper end 88 is provided with a snap ring groove 102 and the lower end is provided with a snap ring groove 104.

The accelerator arm or lever 28 comprises a disk-like plate 112 which is generally circular and has a circular opening 114 which fits over the lower end 96 of the drive transmitting sleeve 82. A washer 116 is disposed adjacent the accelerator lever 28 and the subassembly is held in place by a snap ring 118 which fits in the groove 104. The accelerator lever 28 includes a radially extending arm 122 which carries a cable connector pin 124 at a selected radius. A stop element in the form of a post 126 is mounted on the accelerator lever 28 near the peripheral edge thereof. The post 126 extends through the plate 112 and is secured thereto as by staking or swaging. Each end of the post is provided with a snap ring groove for purposes to be described subsequently.

A coiled torsion spring 132 is disposed adjacent the accelerator lever 28. The inner end 134 of the torsion spring extends laterally from the plane of the inner coil and seats against the flat surface 98 on the lower end of the drive transmitting sleeve 82. The outer end of the spring 132 is formed into a hook 136 which engages the post 126. A snap ring 138 snaps into the groove on the end of the post 126 to retain the spring 132.

The override lever 48 comprises a disk-like plate 142 which is provided with a central opening 144 which is of the same configuration as the cross-section of the end 88 of the drive transmitting sleeve 82. Thus, the opening 144 is circular with two flat sides and the lever 48 is nonrotatable with reference to the drive transmitting sleeve 82. The override lever 48 is held in place on the sleeve 82 by a snap ring 146 which seats in the groove 102. The override lever 48 is provided with a radially extending arm 148 which carries a cable connector pin 152 at a selected location on the arm. The lever 48 also has a radially extending arm 154 which carries the cable connector pin 156.

A coiled torsion spring 162 is of the same construction as the spring 132. It has its inner end 164 bent over so that it seats on the flat surface 92 on the upper end of the drive transmitting sleeve 82. The outer end 166 of the spring 162 is formed into a hook which engages the top end of the post 126. A snap ring (not shown) is located on the top end of the post 126 to retain the spring 162.

The cable connections are shown in greater detail in FIG. 3. The core 26 of the cable 18 from the accelerator is connected with the connector pin 124 on the accelerator lever 28. The core 46 of the cable 32 from the control arm 36 is connected with the connector pin 152 on the override lever 48. The core 62 of the cable 56 from the governor 12 is connected to the connector pin 156 of the override lever 48.

The operation of the transfer device 10 is as follows. When the governor is not actuated to establish a throttle limiting position, the movement of the accelerator 16 by the driver is imparted through the cable 18 to the accelerator lever 28. The torque applied to the lever 28 is transmitted through the post 126 and the springs 132 and 162 to the drive transmitting sleeve 82 and thence to the override lever 48. Under this condition, the torsion springs 132 and 162 are not deflected and the override lever 48 moves concurrently with the accelerator lever 28. The motion of the override lever 48 is transmitted through the cable 32 to the throttle control lever 36. The cable 56 from the governor to the override lever 48 does not impose any restraint on the movement of the lever 48 under this condition. However, when the governor 12 is actuated and the overriding throttle closing member 54 thereof is moved to a limiting position, the operation is as follows. The movement of the accelerator 16 is transmitted to the accelerator lever 28 and through the torsion springs 132 and 162 to the override lever 48 and thence to the throttle lever 36 in the same manner as described above but only until the override lever 48 reaches the throttle limit position set by the governor. At that point, the movement of the override lever 48 is arrested by the governor. Any further actuation of the accelerator 16 toward the open throttle direction results in continued rotation of the accelerator lever 28 which is permitted by deflection of the torsion springs 132 and 162. Thus, the driver can continue to operate the accelerator after the limit position is reached but it is ineffective to cause further opening of the throttle. The driver encounters a somewhat greater resistance to movement of the accelerator when the limit position is reached and thus notices that the action of the governor is in effect.

Although the description of this invention has been given with reference to an illustrative embodiment, it is not to be construed in a limiting sense. Many variations and modifications will now occur to those skilled in the art. For a definition of the invention reference is made to the appended claims.

What is claimed is:

1. For use in installing an engine governor on an engine having a driver operated accelerator adapted for coupling by a flexible cable to a throttle control member of said engine, said governor having an overriding throttle closing member which, when activated, is held at a throttle limiting position, a transfer device for coupling said accelerator and said throttle control member with said overriding throttle closing member, said transfer device comprising:
   a support member including a fixed shaft,
   a drive transmitting sleeve rotatably mounted on said shaft,
   an accelerator lever rotatably mounted on said sleeve for rotation about said shaft,
   an override lever mounted on said sleeve for rotation therewith about said shaft,
   torsion spring means connected between said sleeve and said accelerator lever and exerting a biasing torque tending to cause rotation of said override lever and accelerator lever in opposite directions.
   stop means mounted on one of said levers and engageble by the other of said levers for limiting said rotation,
   a first cable connected between said accelerator and said accelerator lever, a second cable connected between said override lever and said throttle control member and a third cable connected between said overriding throttle closing member and override lever,
   said torsion spring means being capable of transmitting sufficient torque without spring deflection so that said throttle control member moves concurrently with said accelerator until said override lever is held at a throttle limiting position by said overriding throttle closing member whereupon said spring means is deflected by further movement of said accelerator.

2. The invention as defined in claim 1, wherein, said drive transmitting sleeve comprises a cylindrical body having a flat surface thereon and a spacer collar intermediate its ends,
   said accelerator lever having a circular opening therein and being disposed on one side of said collar and rotatable relative to said body,
   said override lever having a circular opening with a flat side and being disposed on the other side of said collar in nonrotatable engagement with said body,
   said stop means comprising an axially extending post on said accelerator lever and a shoulder on said override lever engageable by said post,
   said torsion spring means comprising a coiled spring disposed between one of said levers and the adjacent end of said body with its outer end connected with said post and its inner end connected with said body.

3. The invention as defined in claim 2, wherein, said torsion spring means comprises,
   an additional coiled spring disposed between the other of said levers and the adjacent end of said body and having its outer end connected with said post and its inner end connected with said body.

* * * * *